United States Patent
Auvenshine et al.

(10) Patent No.: US 9,392,405 B1
(45) Date of Patent: Jul. 12, 2016

(54) METHOD FOR DEVICE TO REPORT WHEN IT MAY BE MISSING

(71) Applicant: INTERNATIONAL BUSINESS MACHINES CORPORATION, Armonk, NY (US)

(72) Inventors: John J Auvenshine, Tucson, AZ (US); Henry C Will, IV, Englewood Cliffs, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/997,192

(22) Filed: Jan. 15, 2016

(51) Int. Cl.
*H04W 24/00* (2009.01)
*H04W 4/02* (2009.01)

(52) U.S. Cl.
CPC ...................................... *H04W 4/02* (2013.01)

(58) Field of Classification Search
CPC ....... H04W 4/02; H04W 12/12; H04W 4/028; G08B 21/24; G08B 21/182; G06Q 10/087; G06Q 7/0008; G06K 7/0008
USPC ............. 455/456.3, 410; 340/539.32, 539.11, 340/572.1; 235/385
See application file for complete search history.

(56) References Cited

U.S. PATENT DOCUMENTS

| | | | |
|---|---|---|---|
| 8,810,392 B1* | 8/2014 | Teller | G08B 21/24 235/385 |
| 2011/0141276 A1 | 6/2011 | Borghei | |
| 2012/0190327 A1 | 7/2012 | Holley et al. | |
| 2014/0038555 A1 | 2/2014 | Henderson | |
| 2014/0045457 A1 | 2/2014 | Mahaffey et al. | |
| 2014/0051388 A1 | 2/2014 | Bennett et al. | |
| 2014/0179270 A1 | 6/2014 | Anand | |
| 2015/0179046 A1* | 6/2015 | Stevens | G08B 21/24 455/456.1 |

FOREIGN PATENT DOCUMENTS

FR    2947368 A1    12/2010

OTHER PUBLICATIONS

Lysa Myers, 12 Apple Device Finder Apps Similar to "Find My iPhone", The Mac Security Blog, Aug. 30, 2012, Intego.

* cited by examiner

*Primary Examiner* — Olumide T Ajibade Akonai
*Assistant Examiner* — Alexander Yi
(74) *Attorney, Agent, or Firm* — Shimokaji IP

(57) ABSTRACT

A method of locating a smartphone or electronic device may include determining a location of a such device (e.g. smartphone), continuously monitoring time and location of the smartphone, predicting expected locations of the smartphone, and issuing alerts regarding the location of the smartphone.

1 Claim, 1 Drawing Sheet

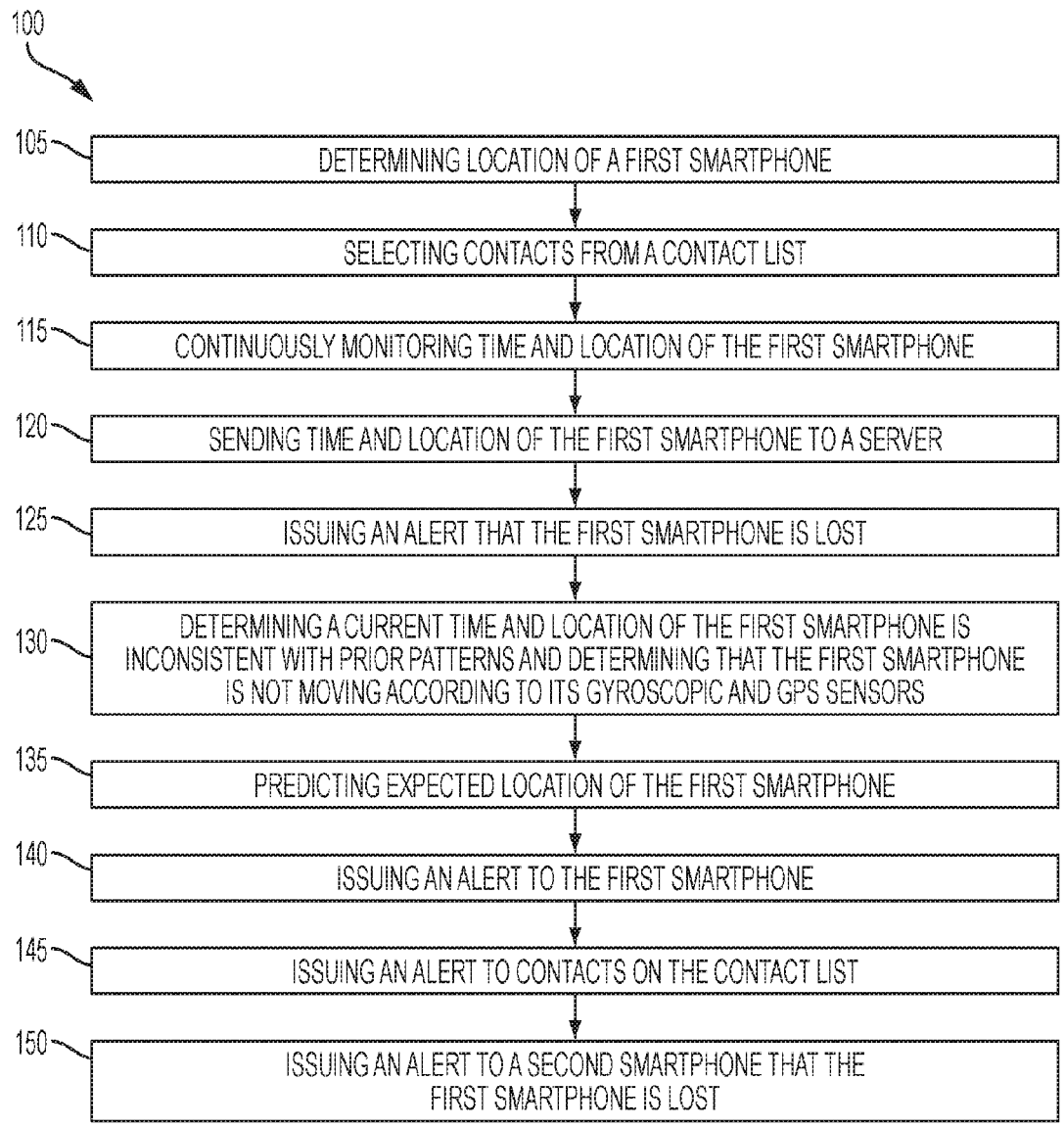

METHOD FOR DEVICE TO REPORT WHEN IT MAY BE MISSING

BACKGROUND OF THE INVENTION

The present invention generally relates to a method of determining the location of a smartphone or other personal electronic device. More particularly, the present invention relates to locating a smartphone and issuing alerts. This invention may also be applied to other mobile devices or any electronic device capable of determining its location and communicating with other electronic devices to report its status.

A person might not realize a device is missing until after a battery runs out or the person is a long way from the device.

As can be seen, there is a need for a method for locating a smartphone and issuing alerts.

SUMMARY OF THE INVENTION

In one aspect, a method may include determining that a first electronic device is not within its expected location, the expected location predicted based on previous movement patterns of the first electronic device captured via location data such as GPS and time associated with the previous movement patterns; selecting contacts from a contact list on the first electronic device for notification of the contacts when the first electronic device is not within its expected location; continuously monitoring time and location data for the first electronic device; sending the time and location data of the first electronic device to a centralized server, wherein the location data of the first electronic device is reported as location coordinates; issuing an alert that the first electronic device is lost, wherein the alert that the first electronic device is lost is based on determining that a current time and location of the first electronic device is inconsistent with prior patterns, and based on determining that the first electronic device is not moving according to its acceleration, gyroscopic and GPS sensors, and based on the electronic device following a set pattern, wherein the expected location is further predicted as a function of a distance between the first electronic device and a second electronic device having the first electronic device's previous movement patterns, wherein the alerting issues a first alert call to the first electronic device, wherein the alerting issues a second alert call to the contacts on the contact list, and wherein the alerting further includes issuing a third alert to the second electronic device that the first electronic device is lost, wherein the expected location is predicted as a function of location in relation to other devices that are located nearby or are known to be traveling with the first electronic device, and wherein the first electronic device tracks it's distance to the second electronic device using electronic signal strength between the devices, wherein when the electronic signal strength is determined to go below a threshold, the first electronic device emits a notification and the second electronic device emits a notification.

These and other features, aspects and advantages of the present invention will become better understood with reference to the following drawings, description and claims.

BRIEF DESCRIPTION OF THE DRAWINGS

FIG. 1 illustrates a method of locating a smartphone and issuing alerts.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method of locating a smartphone and issuing alerts.

Where the term "first electronic device" is used, it may refer to any network connected to a personal electronic device including network connected media players, watches, phones such as smartphones, GPS, tablets, notebook or laptop computers. The term "second electronic device" may encompass all of the devices of the term "first electronic device", and in addition may also include vehicle mounted information, navigation, security, emergency alert/response, or entertainment systems, as well as wired telephones, security systems, desktop computers, and other electronic devices which typically remain in a fixed location.

In FIG. 1, a method 100 may include a step 105 of determining location of a first smartphone. A step 110 may include selecting contacts from a contact list. A step 115 may include continuously monitoring time and location of the first smartphone. A step 120 may include sending time and location of the first smartphone to a server. A step 125 may include issuing an alert that the first smartphone is lost. A step 130 may include determining that a current time and location of the first smartphone is inconsistent with prior patterns and determining that the first smartphone is not moving according to its gyroscopic and GPS location. A step 135 may include predicting an expected location of a smartphone. A step 140 may include issuing an alert to the first smartphone. A step 145 may include issuing an alert to contacts on the contact list. A step 150 may include issuing an alert to a second smartphone that the first smartphone is lost.

In an embodiment, the method 100 may determine when a device such as a smartphone is not in its usual location. The method 100 may determine when a device is not with other devices that it is usually with or has been with recently. The method 100 may determine whether the device is likely to be near an owner of the device if there is not a response from the owner of the device.

In an embodiment, the method 100 may include tracking a person's use of a device, location of the device at certain points of the day and location of the family and friends (including associates) of those who are usually near the person. By tracking the location of the device, the status of operation (when it is set to vibrate or silent), location of people (family and friends) and the patterns of these in relation to time and days, as well as calendar events (such as birthday parties, meetings, etc.), analytics will be able to tell when the device owner may have accidentally left the device somewhere. At this point, the method 100 can send a text message or phone call to a family member or friend to report the possibility of a misplaced device. The method 100 can determine when the device has been misplaced/left by analyzing past location and time series data, and then alert one or more contacts or other devices normally near the person at that time.

In an embodiment, the method 100 reviews repeated data that shows that people identified by the owner as family/friends gather at the same location on specified dates. Then, at a future time, the method 100 may notice that the device location is different than a current normal location for the device. The method 100 can check that there has been no use of the device since the current normal location of the device changed. At this point, the method 100 may attempt to alert the user on the device itself. In an embodiment, If the device hasn't actually been left or lost, the user can respond without any notifications going out to anyone else. If the user does not respond to the on-device alert, the notification system then can notify a family/friend (pre-defined by the device owner) that the device may have been misplaced.

Alternately, the notification system can alert a second device owned by the same user such as a tablet, notebook or laptop computer, or vehicle mounted entertainment or navigation system.

In an embodiment, the method 100 may include an application on a smartphone being set up by its owner with permission to monitor device location, identify patterns, and attempt to detect when the device has been misplaced. Contacts from phone's contact list can be selected for notification, and special numbers can be entered for other people or automated systems which are not in the phone's contact list. The application can run continuously (autostart on phone reboot), monitor and record time and location data. In an embodiment, past time and location data can be retrieved from other location tracking services or applications. In an embodiment, with user permission, location data can also be sent to a centralized server for storage, aggregation, and analytics for association with other people.

In an embodiment, misplaced or "left behind" detection can be performed in one or more of the following ways: Analytics internal to the phone (or at a data collector/server) can determine the current time and location of the phone is inconsistent with prior patterns, and (optionally) that the phone is not moving according to its gyroscopic and/or GPS (Global Positioning System) sensors. Analytics performed at the server in conjunction with time and location data from other registered devices/contacts can indicate that the phone is not near other devices it is normally near at this time/location. In this case, a simple alert can be sent to the phone (the location of other devices used in the analytics may not be revealed to protect individual privacy).

In an embodiment, when the method 100 detects the phone has been misplaced/left behind, the following steps can be performed: The method 100 may try an alert on the device itself. If the device hasn't actually been left, the user can respond on the device and others might not be notified. This can greatly decrease "nuisance alerts". The method 100 may only proceed if the user does not respond (optionally, behind a graphic, pin, face recognition, fingerprint, password, or other security mechanism). Alert the contacts the user is normally with at this time (family/friends). In addition, instead of alerting friends and family, in-car or in-home services may also be activated for alerting (such as OnStar, home security systems, and home phone lines may be called with an automated voice system). Alerts may consist of phone calls with automated voice, SMS (Short Message Service), email, or other signalling mechanisms. The current location of the device may optionally be reported as GPS coordinates or a business name or address by performing a reverse GPS coordinate lookup with a mapping system known in the art.

In an embodiment, as an example of the expected location being predicted as a function of location in relation to other devices that are located nearby or are known to be traveling with the first device, if there is a group of people going to lunch and all electronic devices leave the restaurant, except one phone does not, or if everyone gets out of a car with their smart phones, but one does not, or if everyone gets out of a taxi or plane or bus or train and one does not. This may also apply if a smartwatch travels with the person's smartphone and the smartwatch is left somewhere (like the locker in the gym) while the person takes the smartphone with them)

It should be understood, of course, that the foregoing relates to exemplary embodiments of the invention and that modifications may be made without departing from the spirit and scope of the invention as set forth in the following claims.

What is claimed is:

1. A method comprising: determining that a first electronic device is not within its expected location, the expected location predicted based on previous movement patterns of the first electronic device captured via location data such as GPS and time associated with the previous movement patterns; selecting contacts from a contact list on the first electronic device for notification of the contacts when the first electronic device is not within its expected location; continuously monitoring time and location data for the first electronic device; sending the time and location data of the first electronic device to a centralized server, wherein the location data of the first electronic device is reported as location coordinates; issuing an alert that the first electronic device is lost, wherein the alert that the first electronic device is lost is based on determining that a current time and location of the first electronic device is inconsistent with prior patterns, and based on determining that the first electronic device is not moving according to its acceleration, gyroscopic and GPS sensors, and based on the electronic device following a set pattern, and based on analytics performed at the centralized server in conjunction with time and location data from other registered devices indicating that the first electronic device is not near other electronic devices it is normally near at this time or location, wherein the expected location is further predicted as a function of a distance between the first electronic device and a nearby second electronic device having the first electronic device's previous movement patterns and known to be traveling with the first electronic device, wherein the alerting issues a first alert call to the first electronic device if there has been no use of the first electronic device since a current normal location of the first electronic device changed, wherein the alerting issues a second alert call to the contacts on the contact list of whom first electronic device user is normally with at this time if there is no response from the first alert call, and wherein the alerting further includes issuing a third alert to the second electronic device that the first electronic device is lost, wherein the expected location is predicted as a function of location in relation to other devices that are located nearby or are known to be traveling with the first electronic device, wherein the first electronic device tracks it's distance to the second electronic device using electronic signal strength between the devices, wherein when the electronic signal strength is determined to go below a threshold, the first electronic device emits a notification and the second electronic device emits a notification.

* * * * *